United States Patent [19]
Strevey

[11] Patent Number: 5,978,877
[45] Date of Patent: Nov. 2, 1999

[54] TRANSLATING SCSI BUS CONTROL AND/ OR DATA SIGNALS BETWEEN DIFFERENTIAL AND SINGLE-ENDED FORMATS

[75] Inventor: Daniel G. Strevey, Longmont, Colo.

[73] Assignee: Fujitsu Limited, Kanagawa, Japan

[21] Appl. No.: 08/040,428

[22] Filed: Mar. 31, 1993

[51] Int. Cl.⁶ .................................................. G06F 13/40
[52] U.S. Cl. .......................................... 710/128; 710/126
[58] Field of Search .............................. 395/500.46, 527; 710/65, 126, 128, 129

[56] References Cited

U.S. PATENT DOCUMENTS

4,739,323  4/1988  Miesterfeld et al. ................. 340/825.5
4,864,291  9/1989  Korpi .................................... 340/825.5
5,243,623  9/1993  Murdock ..................................... 375/7

*Primary Examiner*—Viet D. Vu
*Attorney, Agent, or Firm*—Sheridan Ross P.C.

[57] ABSTRACT

An apparatus is disclosed for translating between differential and single-ended SCSI signals. The apparatus includes programmable array logic. The TTL equivalent of both differential and single-ended control signals can be inputted to the PAL. The outputs of the PAL are used, together with control logic gates, in controlling the direction of transmission of SCSI control signals. In one embodiment, only bi-directional SCSI control signals are inputted to the PAL. In another embodiment, all SCSI control signals are inputted thereto. In one embodiment, terminator power is used to power components of the translating apparatus.

20 Claims, 10 Drawing Sheets

| SEBSY | DFBSY | BSYDP | BSYSP | BRE output |
|---|---|---|---|---|
| 0 | 0 | X | X | 1 |
| 0 | 1 | X | X | 1 |
| 1 | 1 | 1 | X | 1 |
| 1 | 1 | 0 | 0 | 1 |

FIG. 3A

| SEBSY | DFBSY | BSYSP | BDE output |
|---|---|---|---|
| 1 | 0 | X | 1 |
| 1 | 1 | 1 | 1 |

FIG. 3B

| SEBSY | DFBSY | BSYDP | BSYDP output |
|---|---|---|---|
| 0 | 1 | X | 1 |
| 1 | 1 | 1 | 1 |

FIG. 3C

| SEBSY | DFBSY | BSYSP | BSYDP output |
|---|---|---|---|
| 1 | 0 | X | 1 |
| 1 | 1 | 1 | 1 |

FIG. 3D

| SERST | DFRST | RSTDP | RSTSP | RRE output |
|---|---|---|---|---|
| 0 | 0 | X | X | 1 |
| 0 | 1 | X | X | 1 |
| 1 | 1 | 1 | X | 1 |
| 1 | 1 | 0 | 0 | 1 |

FIG. 3E

| SERST | DFRST | RSTSP | RDE output |
|---|---|---|---|
| 1 | 0 | X | 1 |
| 1 | 1 | 1 | 1 |

FIG. 3F

| SERST | DFRST | RSTDP | RSTDP output |
|---|---|---|---|
| 0 | 1 | X | 1 |
| 1 | 1 | 1 | 1 |

FIG. 3G

| SERST | DFRST | RSTSP | RSTSP output |
|---|---|---|---|
| 1 | 0 | X | 1 |
| 1 | 1 | 1 | 1 |

FIG. 3H

| SESEL | DFSEL | SELDP | SELSP | SRE output |
|---|---|---|---|---|
| 0 | 0 | X | X | 1 |
| 0 | 1 | X | X | 1 |
| 1 | 1 | 1 | X | 1 |
| 1 | 1 | 0 | 0 | 1 |

FIG. 3I

| SESEL | DFSEL | SELSP | SDE output |
|---|---|---|---|
| 1 | 0 | X | 1 |
| 1 | 1 | 1 | 1 |

FIG. 3J

| SESEL | DFSEL | SELDP | SELDP output |
|---|---|---|---|
| 0 | 1 | X | 1 |
| 1 | 1 | 1 | 1 |

FIG. 3K

| SESEL | DFSEL | SELSP | SELSP output |
|---|---|---|---|
| 1 | 0 | X | 1 |
| 1 | 1 | 1 | 1 |

TRANSLATING SCSI BUS CONTROL AND/ OR DATA SIGNALS BETWEEN DIFFERENTIAL AND SINGLE-ENDED FORMATS

FIELD OF THE INVENTION

The present invention relates to a SCSI translating apparatus connected to a SCSI system, particularly a translator that controls the path taken by SCSI control and data signals after priority is determined by the system and in which SCSI power can be used to energize translator components.

BACKGROUND OF THE INVENTION

SCSI (small computer system interface) bus protocol is used in facilitating communication between one or more initiators and one or more targets. Generally speaking, a computer is used as an initiator and a peripheral device, such as a disk drive, is used as a target. The initiator typically initiates an operation while the target performs the operation. In conjunction with providing the communication path, single-ended interfaces are commonly incorporated in both initiator and target SCSI devices where the maximum cumulative cable length between the devices is 6.0 meters. Differential interfaces are commonly incorporated in both initiator and target SCSI devices where the maximum cumulative cable length is 25 meters, although differential interfaces can be used in applications requiring less than 6.0 meters. A single-ended interface is involved with the use of one signal in representing each control and data signal sent over the SCSI bus, while a differential interface is involved with the use of two signals (positive and negative polarity signals) in representing each control and data signal sent over the SCSI bus.

The SCSI bus for carrying differential signals cannot be directly coupled to a SCSI bus that carries single-ended signals. In order to provide desired communication between the different cables connected to initiators and targets, single-ended signals must be translated to differential signals and differential signals must be translated to single-ended signals. In one application, it is necessary to test the interfaces of single-ended initiator(s) and differential target(s). Interconnection between single-ended initiator(s) and differential target(s) can establish interface functionality without additional test equipment, typically SCSI simulators. That is, it would be desirable to test such interfaces by connecting the targets and initiators together using a translator intermediate the initiators and targets. In connection with providing the requisite translation, it is essential that, once priority is established by the system for a particular SCSI control signal, the translator maintain control for the initiator or target that was granted priority, until that initiator or target becomes inactive and releases priority.

U.S. Pat. No. 4,864,291 to Korpi issued Sep. 5, 1989 and entitled "SCSI Convertor" describes an apparatus for converting between single-ended and differential SCSI signals. The converter logic appears to be involved with the process for establishing priority when more than one device seeks access to the SCSI bus, during the arbitration phase, at the same time. This converter appears to become involved before a determination is made as to which one of the initiators and targets will be awarded bus priority. This configuration is relatively complicated and discloses different logic for avoiding latch-up conditions, i.e., circuitry that converts between single-ended and differential signals may become latched and then cannot be released, such as when more than one device seeks access to the SCSI bus at the same time.

SUMMARY OF THE INVENTION

In accordance with the present invention, an apparatus is disclosed for translating between single-ended and differential SCSI signals. The apparatus controls priority as a function of the SCSI control signal that was received first. If a first received SCSI control signal is a single-ended signal, the translator translates this single-ended control signal into a differential control signal, so long as this single-ended control signal is active. Conversely, if a first received control signal is a differential signal, the translator is configured to translate this differential control signal into a single-ended control signal, so long as this differential control signal is active.

The apparatus, in one embodiment, includes programmable array logic (PAL) that controls the conversion and resulting transmission of control signals between a single-ended SCSI bus connected to a first SCSI device and a differential SCSI bus connected to a second SCSI device. In one embodiment, the control signals inputted to the PAL are only bi-directional SCSI control signals, which are the reset, busy and select signals for each of the single-ended SCSI and the differential SCSI. In another embodiment, the PAL receives as inputs and acts on all SCSI control signals.

The PAL includes similar logic for acting on sets or pairs of related control signals. Each set, such as single-ended reset and differential reset, is inputted to the same decision-making logic. In determining whether one of the bi-directional SCSI single-ended or differential control signals is present, logic is provided such that only the states of the control signal that is present and its counterpart control signal are taken into account in establishing the state of the translator, i.e., whether the conversion of the particular control signal is to be made from a single-ended to differential signal or from a differential to single-ended signal. By way of example, when a differential reset signal is received by the PAL, the PAL outputs an enable signal as a function of the differential reset signal and its counterpart single-ended reset signal. This enable signal is identified as a reset receiver enable signal. The state of the reset receiver enable signal allows a SCSI reset signal to be transmitted to the single-ended SCSI unit. In this embodiment, the PAL also outputs a reset driver enable signal which has a logic state that prevents the passing of a SCSI reset signal to the differential SCSI unit from the single-ended SCSI unit. With respect to controlling the transmission in the determined direction based on the states of the enable signals outputted by the PAL, a plurality of control gates are provided in communication with such enable outputs.

The bi-directional SCSI control signals have equivalent logic by set. The logic that acts on the states of a single-ended reset and differential reset (as a set of signals) is equivalent to the logic applied to each of the set of differential select and single-ended select and the set of differential busy and single-ended busy. Each of the three sets of control signals is inputted to the PAL in order to determine the state of the receiver enable and driver enable signals that constitute the outputs of each equivalent logic set. The logic that is utilized also generates a priority bit or signal. The state of the priority signal is useful in controlling the state(s) of enable signal(s) if a control signal and its counterpart are received by the translating apparatus at the same time.

The control signal inputs to the PAL are provided by driver/receiver circuitry that is connected to differential control signals received from a differential SCSI bus. Further inputs to the PAL are provided by receiver circuitry electrically connected to the single-ended SCSI bus. The driver/receiver circuitry receives differential SCSI control signals and outputs a single signal corresponding to the differential signal. When the translating apparatus is translating single-ended signals to differential signals, the driver/receiver circuitry translates its inputted signal(s) to differential signal(s).

With regard to applying power to the foregoing components of the translating apparatus, in one embodiment, terminator power from one or both of single-ended and differential SCSI devices is applied to these components. Terminator power is normally applied through the use of "terminator power contacts" and can be supplied by any SCSI device, but is typically supplied by the first physical device on the SCSI bus ("head of string"). When such terminator power is used to supply power to the translating apparatus, the terminating resistors physically located in the SCSI device at the end of the SCSI bus ("end of string") are powered by that device's own power supply.

Based on the foregoing summary, a number of salient features of the present invention are immediately recognized. A translator is provided that converts between single-ended and differential SCSI signals. The SCSI translator operates independently of the priority that is established by the system to which the translator is connected. That is, the translator receives SCSI control signals that have already been prioritized and, based on the first received control signal, establishes translator priority for converting either a single-ended control signal to a differential control signal or a differential control signal to a single-ended control signal. The translator handles all standard bi-directional SCSI control signals including the reset, select and busy signals. Virtually the same logic in programmable array logic is utilized for each set of related SCSI control signals. In conjunction with the translation, enable signals are generated, with each being a function substantially only of one single-ended or differential control signal and its counterpart. In one embodiment, the translator is configured so that one or more initiators, and targets as well, can be connected to either input side of the translator, while targets are connected to its other input side. As a consequence, the operator or user is able to connect the initiator to a selected one of either the single-ended or differential side of the translator. Lastly, no separate power supply is required for operating the translator. Power can be provided using standard terminator power that accompanies a single-ended SCSI device and/or a differential SCSI device.

Additional advantages of the present invention become readily apparent from the following discussion, particularly when taken in conjunction with the accompanying drawings.

DETAILED DESCRIPTION

Figure 1:
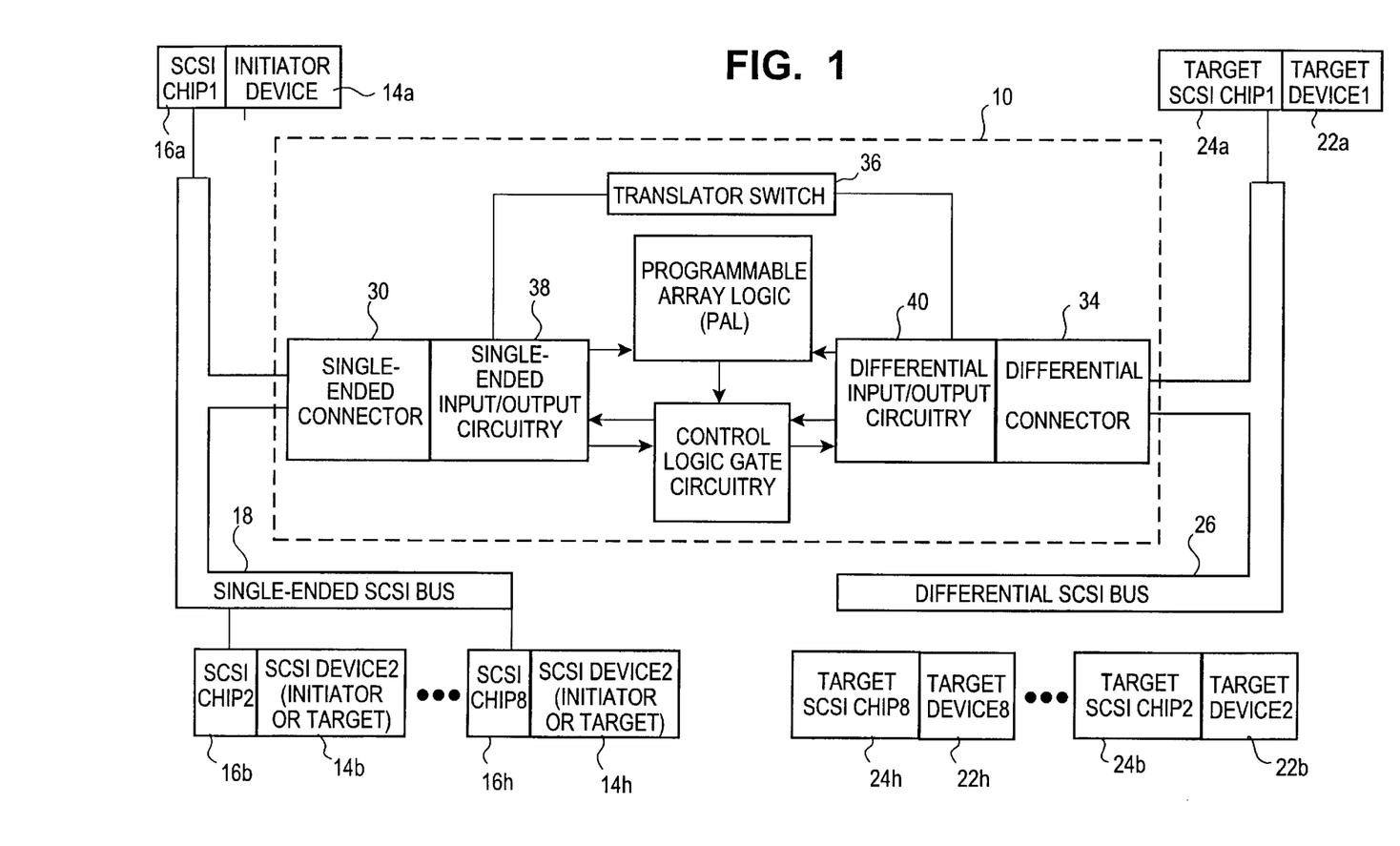
FIG. 1 is a block diagram of the present invention illustrating the major components of a translator.

With reference to FIG. 1, a small computer system is illustrated that includes the translating apparatus or translator 10 of the present invention. The computer system includes one or more initiator devices 14 including a SCSI chip 16 connected to a single-ended SCSI bus 18 for carrying SCSI control signals and data signals from the initiator device 14. The computer system also includes one or more target devices 22 including a target SCSI chip 24 connected to a differential SCSI bus 26. The initiator device 14 is commonly a computer. The target device 22 is commonly a peripheral device, such as a disk drive or tape drive. The maximum number of SCSI devices resident on both the single-ended and differential sides of the translator 10 is eight. The master bus (where the initiator is physically located) and the slave bus (where only targets are located) are logically the same bus and is limited by SCSI specification to eight SCSI devices. The translator 10 is not a SCSI device in the sense of responding to SCSI protocol, but its response is a function of other devices connected to the busses 18, 26. The differential SCSI bus 26 operates, as does the single-ended SCSI bus 18, according to standard SCSI protocol. Because the single-ended signals carried by the single-ended SCSI bus 18 are incompatible with the differential signals carried by the differential SCSI bus 26, the translator 10 acts to translate such signals so that they are compatible with the busses 18, 26.

The translator 10 includes circuitry for controlling/establishing and maintaining priority associated with the path taken by SCSI control and data signals. For a given SCSI control signal outputted by the system to which the translator 10 is connected and resulting in this SCSI control signal being sent to the translator 10 by one of the two SCSI busses 18, 26, the translator 10 determines that the control signal is present and controls the transmission of this signal based on whether its counterpart control signal is already present. If the system causes a particular control signal to be transmitted first from the initiator device 14a to the target device 22a, the translator 10 is configured to allow such a transmission, while not allowing transmission from the target device 22a to the initiator device 14a of its counterpart control signal while this particular control signal is present or active. Conversely, if the system causes a particular control signal to be sent first from the target device 22a to the initiator device 14a, the translator 10 configures itself to permit such signal transmission, while not allowing transmission of its counterpart SCSI control signal in the direction from the initiator device 14a to the target device 22a while this particular control signal is present or active.

With regard to standard SCSI control signals, it is important that once the system sends a particular control signal, the counterpart SCSI control signal not be permitted to be translated by the translator 10 in order to avoid a latch-up condition. Such SCSI control signals that might be generated for transmission in the opposite direction are controlled by the translator 10. For example, if the translator 10 is translating a SCSI single-ended reset control signal from the single-ended SCSI bus 18 to the differential SCSI bus 26, the differential reset control signal from the differential SCSI bus 26 should not be permitted to be transmitted through the translator 10. Accordingly, it is important that standard SCSI bi-directional (signal paths in both directions between an initiator device 14a and a target device1 22a) control signals be regulated so as not to permit such an occurrence. The standard SCSI bus control signals include three bi-directional signals, which are:

(1) Reset—this control signal creates a reset condition in the SCSI bus;

(2) Busy—this signal indicates that the SCSI bus is being used; and (3) Select—this signal is used by an initiator to select a target or by a target to reselect an initiator.

Because these signals are bi-directional, it is necessary that the translator 10 function to control their transmission so that each such bi-directional signal is active in only one direction at a time.

In addition to the bi-directional control signals, there are a number of standard SCSI control signals that are uni-directional, namely:

(3) Control/Data—a signal driven by a target that indicates whether control or data information is on the SCSI bus;

(4) Input/Output—a signal driven by a target that controls the direction of data movement on the SCSI bus with respect to an initiator;

(5) Message—a signal driven by a target during the message phase of the SCSI bus;

(6) Request—a signal driven by a target to indicate a request for a request/acknowledge data transfer handshake;

(7) Acknowledge—a signal driven by an initiator to indicate an acknowledgement for a request/acknowledge data transfer handshake; and (8) Attention—a signal driven by an initiator to indicate the attention condition.

Because of the uni-directional nature of these signals, it is feasible to handle these SCSI control signals differently from the bi-directional SCSI control signals. That is, because such signals are only transmitted in one direction, it is not anticipated, because of SCSI protocol, that such signals will be improperly generated and be transmitted in an unwanted direction.

However, in one embodiment, the translator 10 is configured to handle all SCSI control signals in the same manner. In such an embodiment, the translator 10 is adaptable to be selectably joined to either bus 18 or bus 26 with respect to the initiator. That is, either side of the translator 10 can be connected to the initiator or initiators. As seen in FIG. 1, the single-ended SCSI bus 18 is connected to the translator 10 using the single-ended connector 30, while the differential SCSI bus 26 is connected to the translator 10 using the differential connector 34. In making these connections, it is necessary that a translator switch 36, or a functionally equivalent element, be used to properly establish the side of the translator 10 that the initiator(s), such as initiator device1 14a, is connected to. Since the data path and direction of data flow through the translator 10 is controlled by the I/O control signal, it is necessary that the direction of this I/O control signal be established or known, depending upon which side of the translator 10 has the initiator(s). In FIG. 1, the initiator device 14a is connected to the single-ended bus 18. Hence, the translator switch 36 is controlled to make sure that the direction of the I/O control signal is correct, i.e., from the initiator(s) to the target(s) (from bus 18 to bus 26).

Alternatively, the initiator device 14(a) could be connected to the differential bus 26. In this embodiment, the translator switch 36 is positioned in a state to establish data flow through the translator 10 in an opposite direction, with the I/O control signal being established for causing data flow in this direction, i.e., from bus 26 to bus 18. Even with this selectability, each initiator can only be connected to the translator 10 at one side thereof at any one time for proper operation, while targets can be connected to one or both sides of the translator 10 at any one time during normal operation.

With respect to this embodiment having the initiator location selectability aspect, the connectors 30, 34 communicate with input/output circuitry 38, 40, respectively. Such circuitry is capable of converting inputted differential signals to single-ended signals and converting inputted single-ended signals to differential signals. Additionally, the circuitry 38, 40 is capable of converting differential signals to single-ended signals that are to be outputted by the translator 10 and converting single-ended signals to differential signals that are to be outputted by the translator 10.

In another embodiment in which the initiator(s) can be located on only one predetermined side of the translator 10, common input/output circuitry 38, 40 is not utilized. In such a case, single-ended input/output circuitry communicates only with the single-ended SCSI bus 18 through the single-ended connector 30 and also with other circuitry within the translator 10. Correspondingly, the differential connector 34 communicates with differential input/output circuitry, which is different from the single-ended input/output circuitry, and also communicates with other translator 10 circuitry. Such an embodiment is useful when the translator 10 responds to bi-directional SCSI control signals in a manner different from uni-directional SCSI control signals. Such an embodiment is illustrated in greater detail in FIG. 2.

Figure 2A:
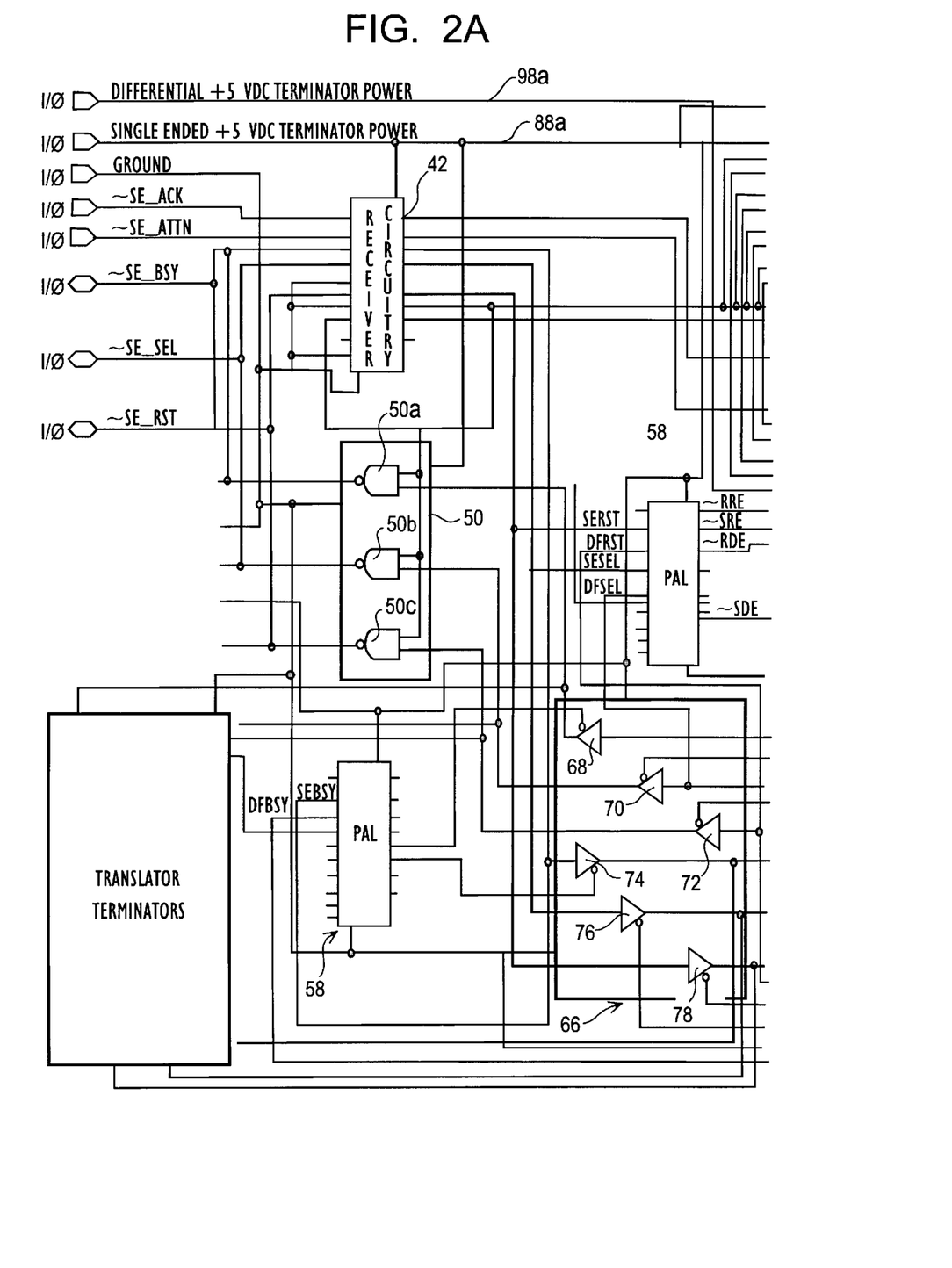
FIG. 2 illustrates a more detailed schematic of a translator.
Figure 2B:
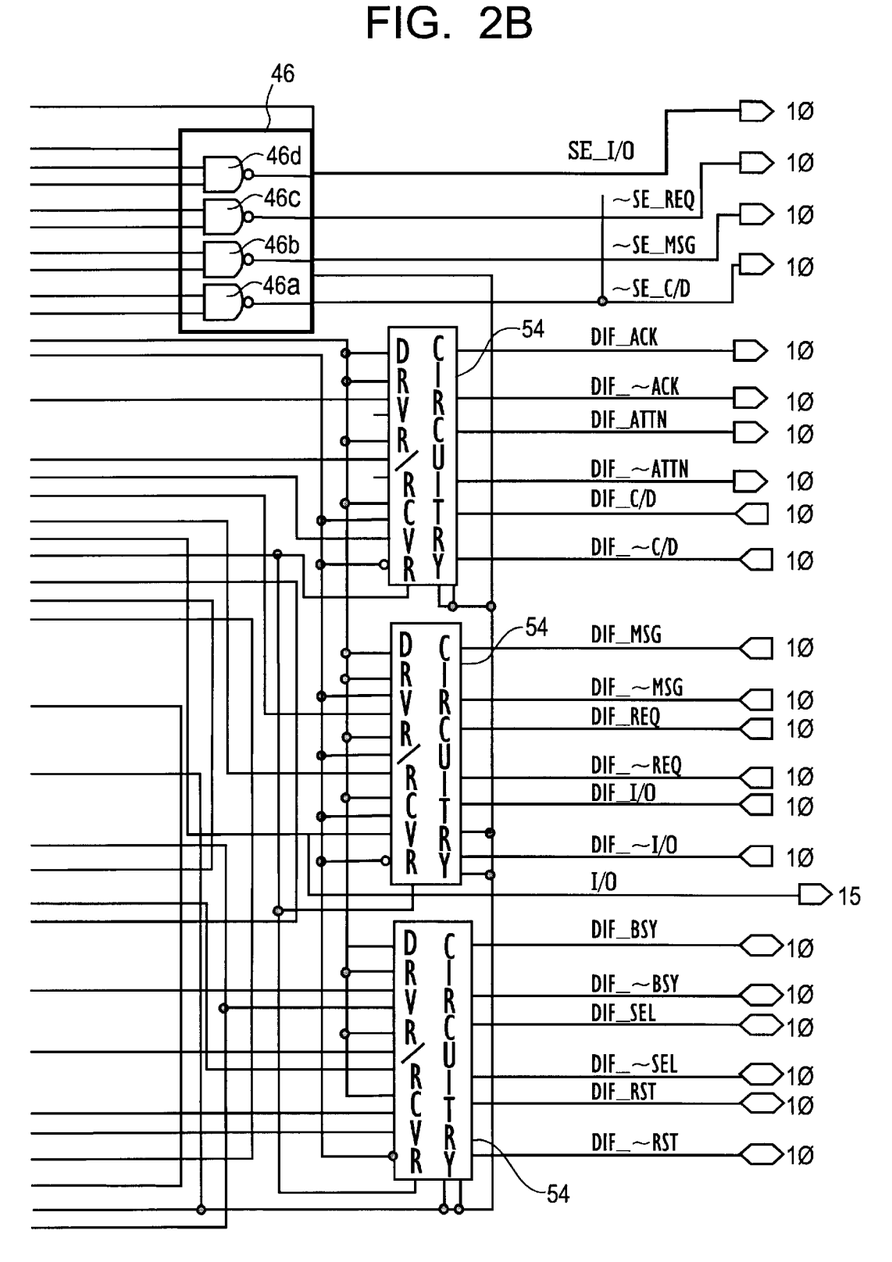

Referring now to FIG. 2, a translator 10 is illustrated that is characterized by a configuration that translates SCSI control signals and responds to bi-directional SCSI control signals differently from uni-directional control signals. In this embodiment, the single-ended input/output circuitry 38 for connection to the single-ended SCSI bus 18 includes receiver circuitry 42, uni-directional open collector Nand circuitry 46 and uni-directional open collector Nand circuitry 50. The receiver circuitry 42 functions as a receiver/buffer and an inverter. The receiver circuitry 42 is responsive to both uni-directional and bi-directional control signals residing on the single-ended SCSI bus, along with active pull-ups and pull-downs used in translator internal circuitry. Since the acknowledge and attention control signals originate only from the initiator(s) 14, such as the initiator device 14a, and not a target device 22, such as the target device 22a, the control lines associated with these signals are illustrated as being in one direction. Since the remaining standard SCSI control signals that are uni-directional originate only from the differential SCSI bus 26, these other control signals need not be provided as inputs to the translator 10 through the receiver circuitry 42. In this embodiment, in order to translate the unidirectional single-ended control signals, i.e., the single-ended acknowledge and single-ended attention control signals, they are applied to driver/receiver circuitry 54. The driver/receiver circuitry 54 converts these single-ended signals to differential signals for subsequent transmission to the differential SCSI bus 26.

The driver/receiver circuitry 54 also functions as input circuitry for all of the SCSI differential signals received from the differential SCSI bus 26. These uni-directional differential SCSI control signals include control/data (DIF_C/D), message (DIF_MSG), request (DIF_REQ), and input/output (DIF_I/O). These control signals from the differential SCSI bus 26 are converted by the driver/receiver circuitry 54 to TTL compatible signals, which in turn are converted to single-ended signals by open collector Nand gates 46. The outputs generated by the driver/receiver circuitry 54 for these inputted uni-directional control signals are applied to the set of open collector Nand gates 46. Each of these uni-directional control signals is applied to a separate one of the set of open collector Nand gates 46. For example, the differential control/data signal is outputted by the driver/receiver circuitry 54 to the open collector Nand gate 46a. When both inputs to the open collector Nand gate 46a are a logic high, a single-ended control/data control signal is outputted by the translator 10. The other input to each of the open collector Nand gates 46 is provided by the receiver circuitry 42, which continuously outputs a logic high to the open collector Nand gates 46 upon power applied to the receiver circuitry 42.

As seen in FIG. 2, the translator 10 also includes programmable array logic (PAL) 58. The PAL 58 is conventional or standard logic circuitry that includes a matrix of fuses that connect to a number of logic gates. Depending upon the design logic to be implemented and the results to be achieved, determined fuses in the PAL 58 are blown to achieve the desired logic function. The fuses of the PAL 58 that are blown control the actions or functions of the logic gates and the direction of signal flow in the PAL 58. The PAL 58 optimizes space, is relatively less expensive and performs the necessary logic functions in rapid fashion. As illustrated in FIG. 2, for this embodiment, only bi-directional SCSI control signals are inputted to the PAL 58. These are: single-ended reset (SERST), differential reset (DFRST), single-ended select (SESEL), differential select (DFSEL), single-ended busy (SEBSY) and differential busy (DFBSY) control signals. Depending upon the state of these control signal inputs, the combinatorial logic of the PAL 58 controls the state of enable signals outputted by the PAL 58. PAL output signals are: reset receiver enable (RRE), select receiver enable (SRE), reset driver enable (RDE), select driver enable (SDE), busy receiver enable (BRE) and busy driver enable (BDE). Each of these enable signals are used in controlling the direction of control signals through the translator 10.

Figure 3A:
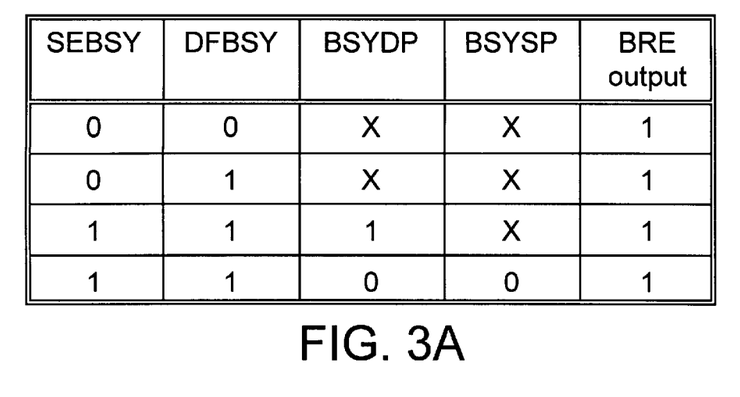
FIGS. 3A–3L illustrate truth tables utilized in determining the states of enable signals based on inputted SCSI control signals.
Figure 3B:
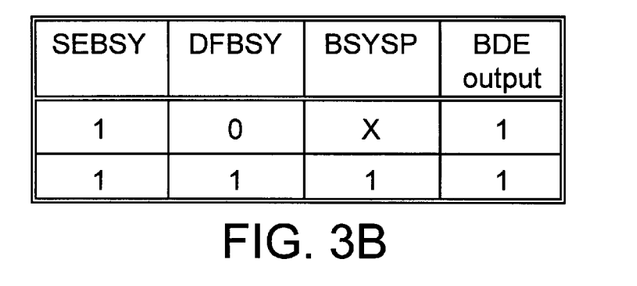
Figure 3C:
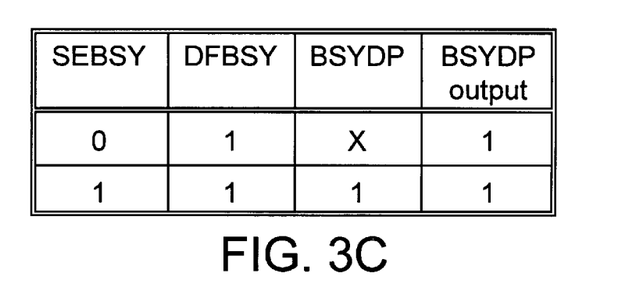
Figure 3D:
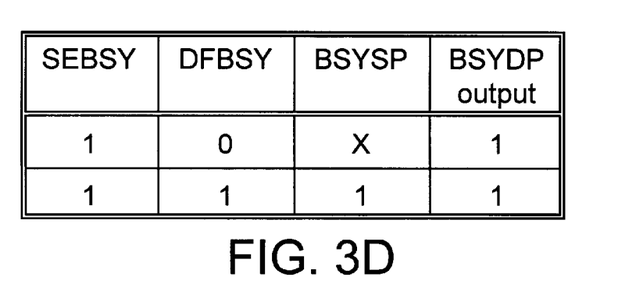

Referring now to FIGS. 3A–3L, a number of truth tables are depicted that illustrate output states of the PAL 58 and control signal inputs associated with such outputs. All states not depicted in the truth tables will result in an inactive output. Only conditions that result in the active state are illustrated. For each bi-directional control signal, namely the busy, reset and select signals, four truth tables are provided. FIGS. 3A–3D relate to the busy control signal, FIGS. 3E–3H relate to the reset control signal and FIGS. 3I–3L relate to the select control signal. Referring to FIG. 3A, it is seen that the truth table comprises a number of columns indicating the state of certain identified signals and the last column indicating the output, which is indicated as being the inverted state and this is the active state inputted to the control gate circuitry 66 of FIG. 2 for controlling the transmission of control signals. The value of 0 indicates an inactive state, the value of 1 indicates an active state and a "X" indicates a don't care state. For example, when single-ended busy=0 and differential busy=1 (active), the inverted busy receiver enable ($\overline{BRE}$)=1 (its active state for controlling transmission of the differential busy signal through the translator 10). Similarly, in a default state, where both single-ended busy and differential busy are inactive (both=0), the busy receiver enable output is also active. As also seen in FIG. 3A, further signals or bits are defined as busy differential priority (BSYDP) and busy single-ended priority (BSYSP). These priority bits are generated by the logic of the PAL 58 using the state of the single-ended busy and the state of the differential busy signals. The priority bits are useful in the possible, but highly unlikely, situation in which the single-ended busy and differential busy control signals are received at the same time. As also understood from FIG. 3A, the busy receiver enable active output is only a function of the busy control signal and not any other SCSI control signal including the reset and select control signals.

Figure 3E:
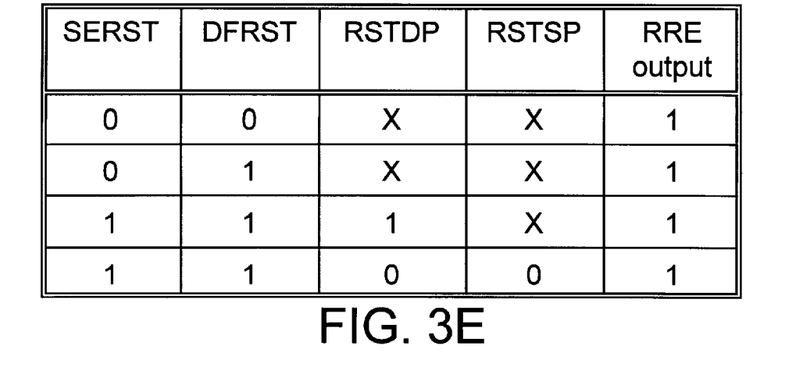
Figure 3F:
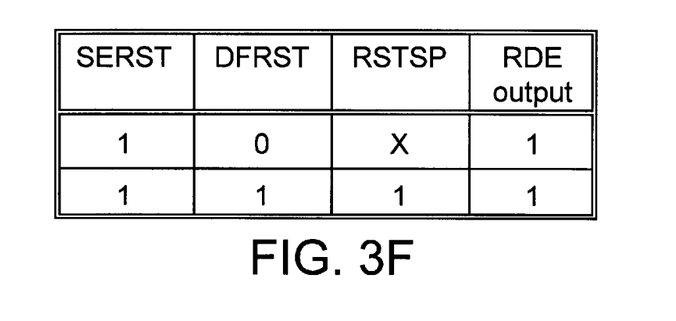
Figure 3G:
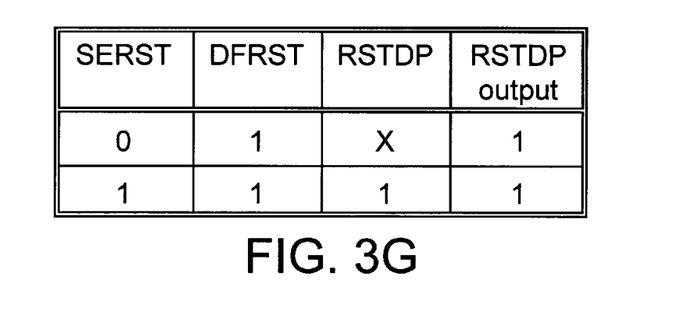
Figure 3H:
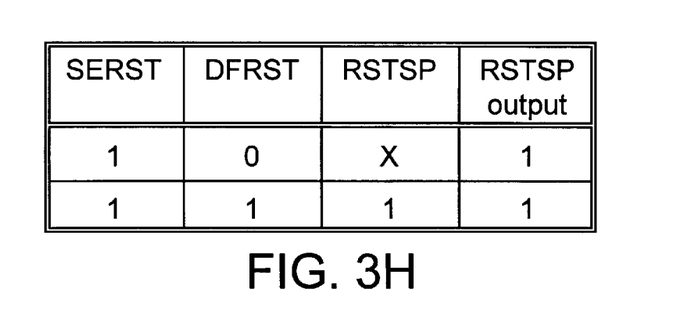
Figure 3I:
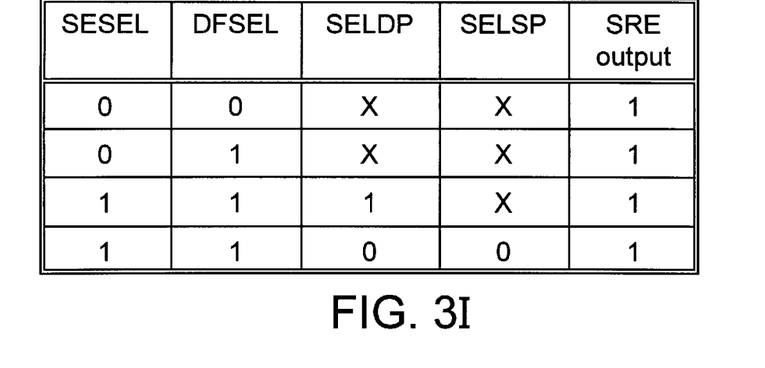
Figure 3J:
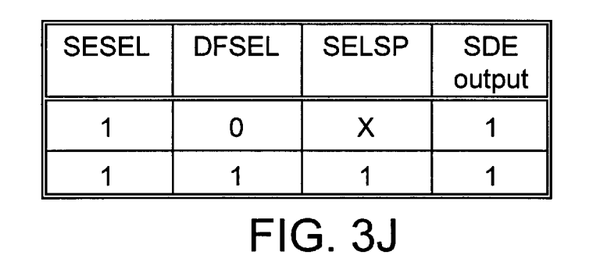
Figure 3K:
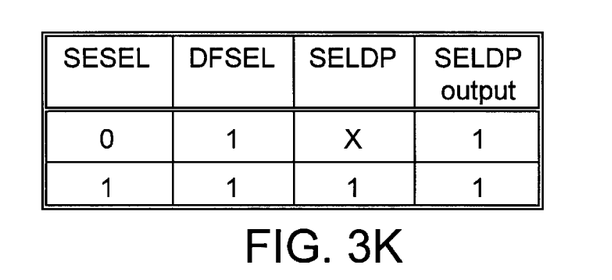
Figure 3L:
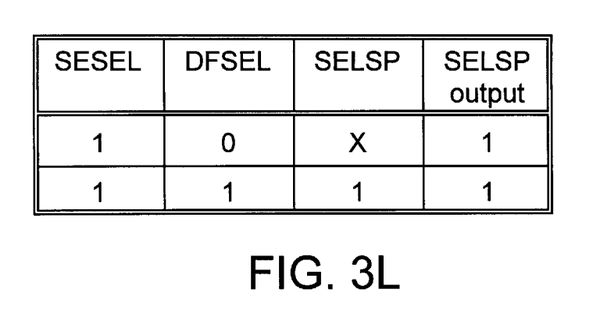

With reference to FIGS. 3E and 3I, it is seen that the truth tables for the reset receiver enable and select receiver enable signals are equivalent to the truth table for the busy control signal of FIG. 3A. Similarly, with reference to FIGS. 3B, 3F and 3J, the truth tables for the driver enable signals associated with the busy, reset and select control signals are equivalent. That is, the inputs utilized and the resulting outputs correspond and the logic utilized in the PAL 58, based on such inputs to achieve corresponding outputs, is the same. Hence, the PAL 58 logic can be configured in the same way for the different control signals to achieve the desired outputs in controlling the control logic gate circuitry 66.

Returning to FIG. 2, the control logic gate circuitry 66 includes a number of control gates 68–78. Each of the six enable signals from the PAL 58 is inputted to one of the control gates 68–78. The control signal receiver enable signals outputted by the PAL 58 are applied to control gates 68, 70, 72. The busy receiver enable signal is applied to control gate 68. The select receiver enable signal is applied to control gate 70. The reset receiver enable signal is applied to control gate 72. The driver enable signals from the PAL 58 are applied to control gates 74, 76, 78. The busy driver enable control signal is applied to control gate 74. The select driver enable signal is applied to control gate 76. The reset driver enable signal is applied to the control gate 78. The state of the enable signals from the PAL 58 regulate whether or not any signal applied to the input of the respective control gate is able to be transmitted or passed through the particular gate. As can be seen in FIG. 2, the gates 68, 70, 72 are used in controlling the transmission of control signals from the driver/receiver circuitry 54 in a direction towards the single-ended SCSI bus 18. The control gates 74, 76, 78 are used in controlling the transmission or passage of control signals towards the driver/receiver circuitry 54 and the differential SCSI bus 26. During normal operation, the states of the enable signals are such that, when transmission is from the differential to the single-ended side of the translator 10, for each differential control signal that is present, the state of the enable signal outputted by the PAL 58 permits each such control signal from the driver/receiver circuitry 54 to be outputted by the appropriate control gate 68, 70, 72 for transmission to the set of open collector Nand gates 50. The busy signal from the driver/receiver circuitry 54, upon controllably passing through the control gate 68, is applied to the open collector Nand gate 50a. The select control signal from the driver/receiver circuitry 54, upon controllably passing through the control gate 70, is sent to the open collector Nand gate 50b. The reset control signal from the driver/receiver circuitry 54, upon controllably passing through the control gate 72, is applied to the open collector Nand gate 50c. The other inputs to each of these open collector Nand gates 50a, 50b, 50c is provided by an output from the receiver circuitry 42, which remains a logic high after application of power. Each of the outputs from the set of open collector Nand gates 50, having been translated by the translator 10, is received by the single-ended SCSI bus 18.

In a similar manner, the control gates 72, 76, 78, upon proper enablement from the appropriate driver enable signal from the PAL 58, allow the particular bi-directional SCSI control signal from the single-ended SCSI bus 18 to pass through the particular control gate to the driver/receiver circuitry 54. From the driver/receiver circuitry 54, the particular control signal can be transmitted by the differential SCSI bus 26. In particular, the control gate 72, upon proper enablement, allows the single-ended busy control signal to be transmitted to the driver/receiver circuitry 54 where it is converted to a differential signal. The control gate 76, upon proper enablement, allows the single-ended select control signal to be sent to the driver/receiver circuitry 54. The control gate 78, when properly enabled, permits the single-ended reset control signal to be sent to the driver/receiver circuitry 54.

With regard to a description of the operation of the translator 10, assume initially that the translator 10 is an inactive state. Subsequently, the target device 22a seeks to transfer data to the initiator device 14a. Assume further that, as part of the SCSI protocol, a differential busy control signal is applied by the differential SCSI bus 26 to the differential connector 34 where it is received by the appropriate input to the driver/receiver circuitry 54. The driver/receiver circuitry 54 changes this differential signal to a TTL compatible signal that is applied to the input of the control gate 68. This same TTL compatible differential busy signal is applied to the PAL 58. In this example, because the differential busy signal is received first over the single-ended busy signal, the logic of the PAL 58, as illustrated in FIG. 3, outputs a busy receiver enable signal (inverted) having a state that regulates the control gate 68 to permit passage of the differential busy signal through the control gate 68. The output of the control gate 68 is applied to the open collector Nand gate 50a. with both inputs to the open collector Nand gate 50a being a logic high, the output of the open collector Nand gate 50a has a state indicative of the presence of a SCSI busy control signal. This output is carried by the single-ended busy control line of the single-ended SCSI bus 18 to the initiator device 14a. At the same time that the busy receiver enable signal is allowing the busy control signal to be transmitted through the control gate 68, the state of the busy driver enable signal outputted by the PAL 58 is applied to the control gate 74. The state of this enable signal does not allow a busy control signal to be transmitted in the direction towards the driver/receiver circuitry 54.

Next assume later that the single-ended SCSI bus 18, under control of the initiator device 14a, sends a single-ended reset control signal that is applied to the translator 10 at the single-ended connector 30. This control signal is received at the predetermined input for the receiver circuitry 42 and passes therethrough. This output from the receiver circuitry 42 is applied to the input of the control gate 78 of the control logic gate circuitry 66. Simultaneously, this reset control signal is inputted to the PAL 58. Using the same logic but different logic hardware circuitry, the logic in the PAL 58 that supports the truth table of FIG. 3F results in a reset driver enable signal being outputted having a state that causes the control gate 78 to pass through the reset control signal to the driver/receiver circuitry 54. In addition, the state of the reset receiver enable signal outputted to the control gate 72 acts to prevent a reset control signal that will occur at the input of the control gate 72 from passing therethrough.

In the embodiment of FIG. 2, referring now to an example of the operation of uni-directional control signals, assume that the control/data signal is inputted to the driver/receiver circuitry 54. The output thereof is applied directly to its associated open collector Nand gate 46a. With the other input to the open collector Nand gate 46a also being a logic high, as controlled by the receiver circuitry 42, a corresponding single-ended control/data signal is outputted by the open collector Nand gate 46a of the translator 10. Similarly, when a uni-directional single-ended control signal, such as the single-ended acknowledge signal is received by the receiver circuitry 42, it is transmitted directly to the driver/receiver circuitry 54. The driver/receiver circuitry 54 outputs the differential acknowledge signal. This signal is then inputted to the differential SCSI bus 26.

Figure 4:
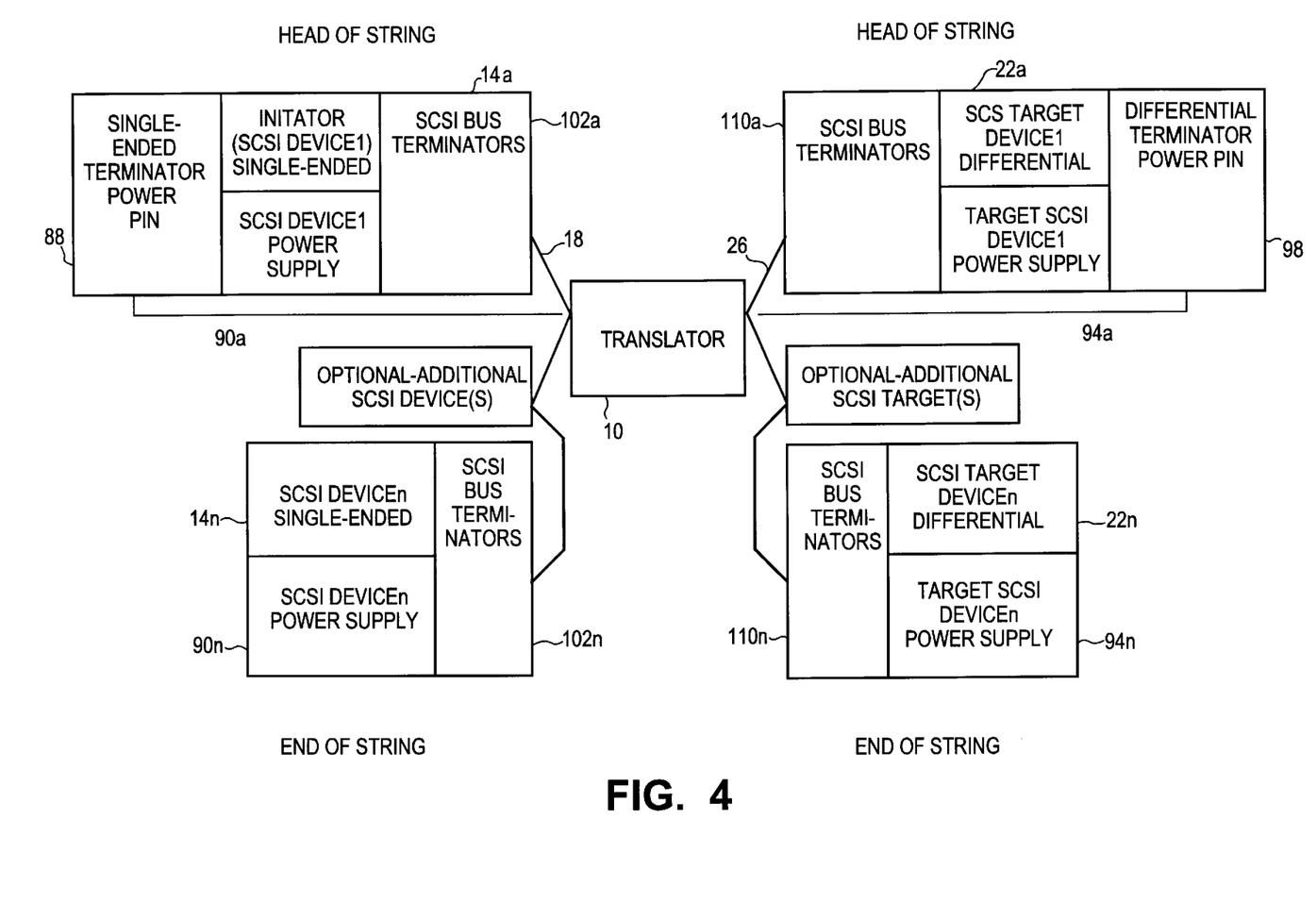
FIG. 4 is a block diagram illustrating power applied to a translator using terminator power supplied by single-ended and differential SCSI devices.

In connection with the implementation of the system that includes the translator 10, in one embodiment, the necessary power to the electronic components of the translator 10 is supplied using SCSI terminator power pins receiving power from power supplies used to power SCSI devices on the busses 18, 26. With reference to FIG. 4, a block diagram represents the application of SCSI power to the components of the translator 10. The initiator 14a at the "head of a string" of SCSI devices connected to the single-ended SCSI bus 18 includes a single-ended terminator power pin 88 that receives power from the initiator SCSI device1 power supply 90a. The terminator power pin 88 supplies power into the single-ended SCSI bus 18 where it can be accessed by the translator 10 for powering components therein.

Likewise, SCSI target device1 22a has a differential terminator power pin 98 that receives power from the target SCSI device1 power supply 94a. The terminator power pin 98 is connected to a power line that extends through the differential SCSI bus 26 where it can be accessed by the translator 10 for powering components thereof.

Accordingly, instead of providing a separate power supply that is dedicated to the translator 10, SCSI power is utilized to avoid an additional power supply since the translator components can be properly powered using available SCSI power. That is, the initiator SCSI device1 power supply 90a, using the single-ended terminator power pin 88, and the target SCSI device1 power supply 94a, using the differential power terminator pin 98, provide the necessary power to the translator components. Even though the SCSI devices located at the head of the string for the respective busses 18, 26 are illustrated as providing translator power, it should be appreciated that power could be supplied to the translator 10 through the terminator power pins associated with any SCSI device on the respective busses 18, 26. When the power on the terminator power pins 88 and 98 is used to supply power to the translator 10, instead of such power on these terminator power pins 88, 98 being supplied to SCSI bus terminators associated with the SCSI device at the end of the strings for these two busses, the SCSI device power supplies themselves for these end of string SCSI devices are used to provide power to the SCSI bus terminators at the end of the string. That is, in the embodiment of FIG. 4, the SCSI devicen power supply 90n powers the SCSI bus terminators provided at the end of string for the single-ended SCSI bus 18. Similarly, the target SCSI devicen power supply 94n powers the target SCSI bus terminators provided at the end of string for the differential SCSI bus 26.

With reference to FIG. 2, an indication is provided as to which components of the translator 10 are powered using terminator power. Specifically, the single-ended terminator power pins 88, from power supplied by the initiator SCSI device1 power supply 90a, supplies power to the receiver circuitry 42, the set of open collector Nand gates 46, the set of open collector Nand gates 50, and the PAL 58. The differential terminator power pin 98a, from power supplied by the target SCSI device1 power supply 94a supplies power to the driver/receiver circuitry 54.

With regard to SCSI bus termination, terminators, such as terminating resistors, are required at both ends of each of the single-ended SCSI bus 18 and differential SCSI bus 26. Consequently, a minimum of two SCSI devices must be connected to each side of the translator 10 in order to configure a terminator powered translator 10. As seen in FIG. 4, with regard to the single-ended SCSI bus 18, the initiator device 14a is connected to the bus 18 at its end having SCSI bus terminators 102a, while the opposite end of the bus 18 has SCSI bus terminators 102n that are connected to the SCSI devicen 14n. Similarly, with regard to the differential SCSI bus 26, target SCSI bus terminators 110a are connected to the end of the bus 26 located at the head of the differential string. The opposite end of the bus 26 (end of string) has target SCSI bus terminators 110n, which are connected to SCSI target devicen 22n. From this, it should be understood that there are no SCSI bus terminators provided where each of the busses 18, 26 connects to the translator 10.

Figure 5:
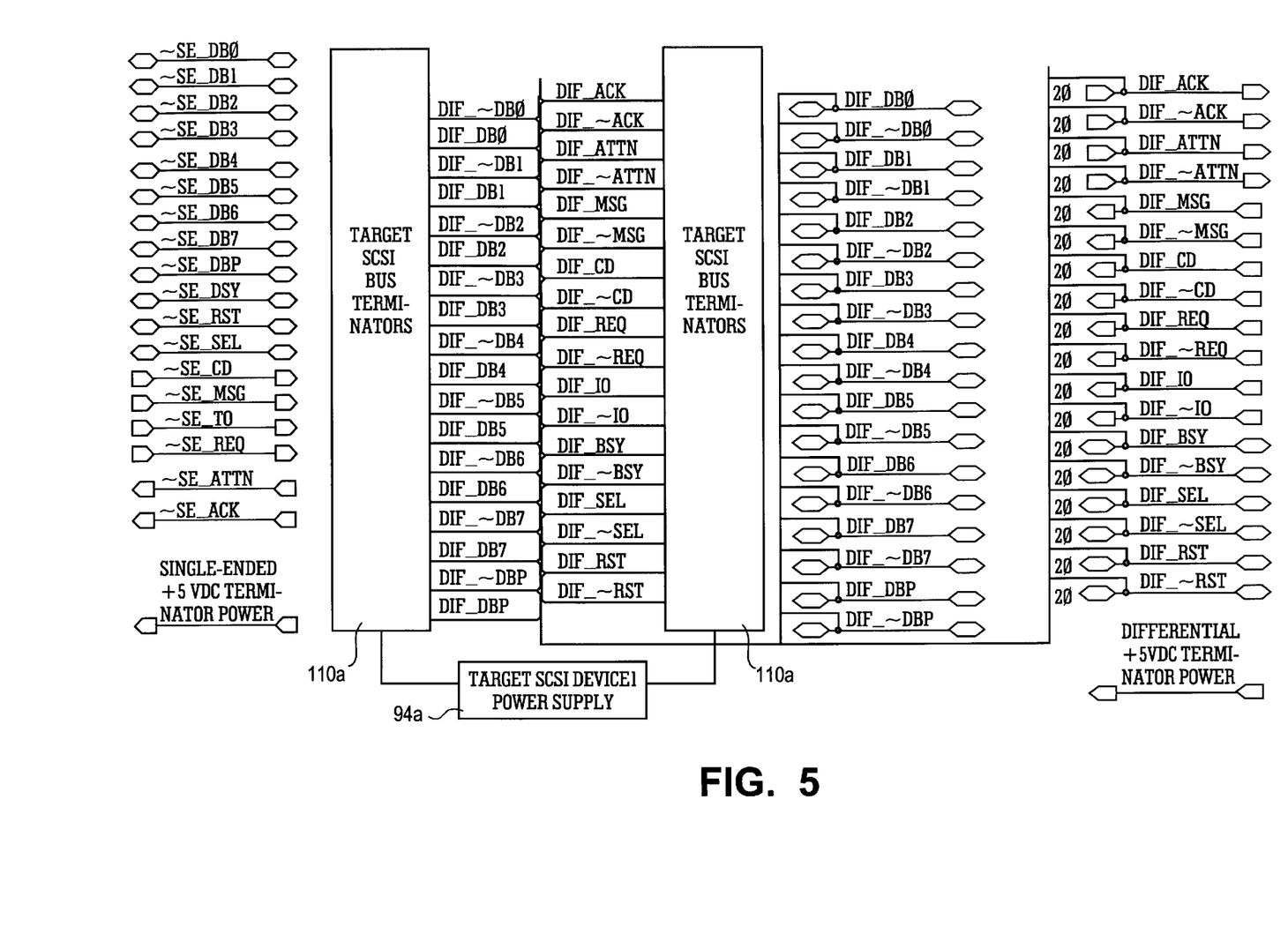
FIGS. 5 and 6 illustrate more detailed schematics representing the removal of terminator resistors from the SCSI bus connector ends that are connected to the translator and use of target and initiator device terminators in providing the necessary terminations.
Figure 6A:
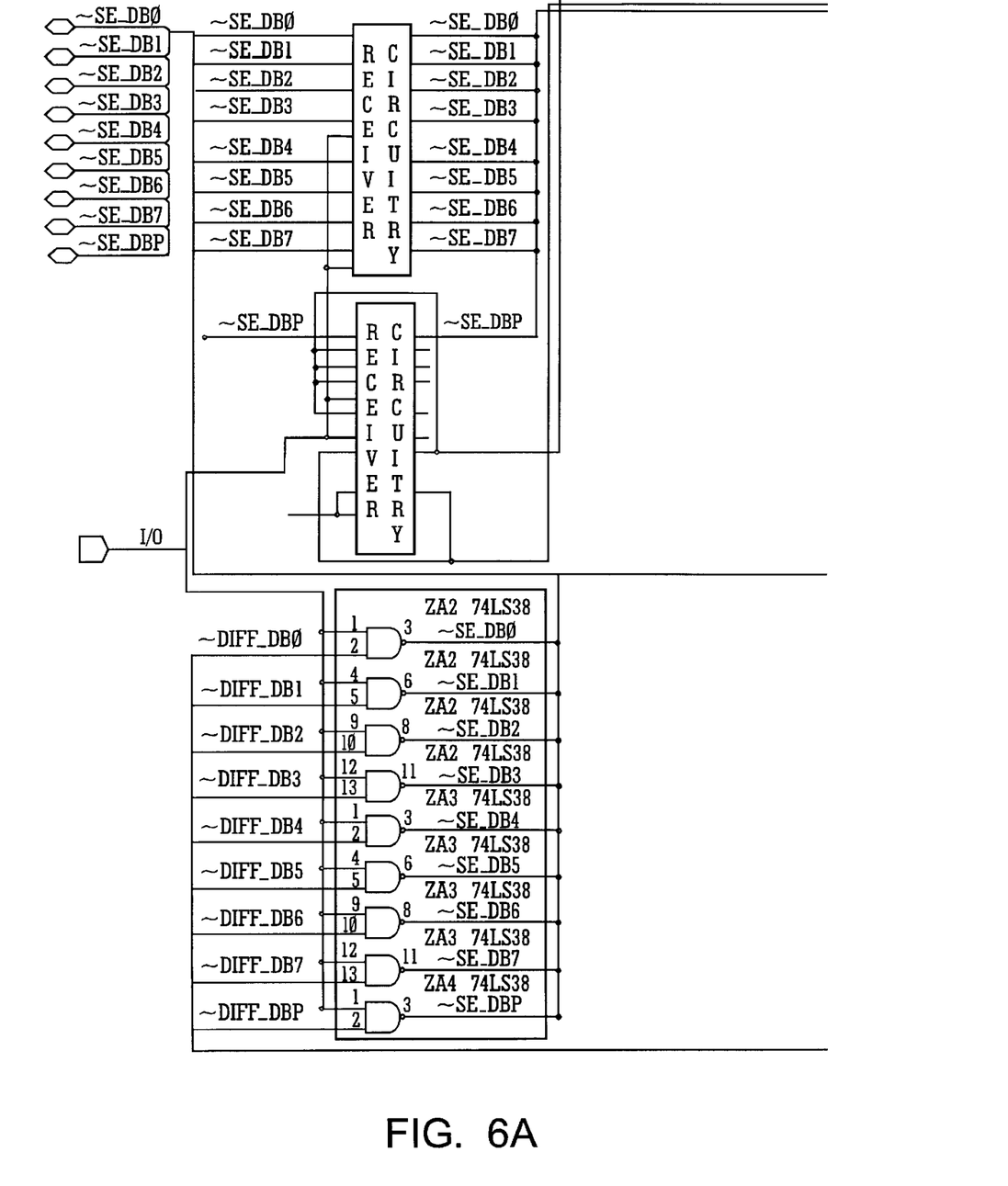
Figure 6B:
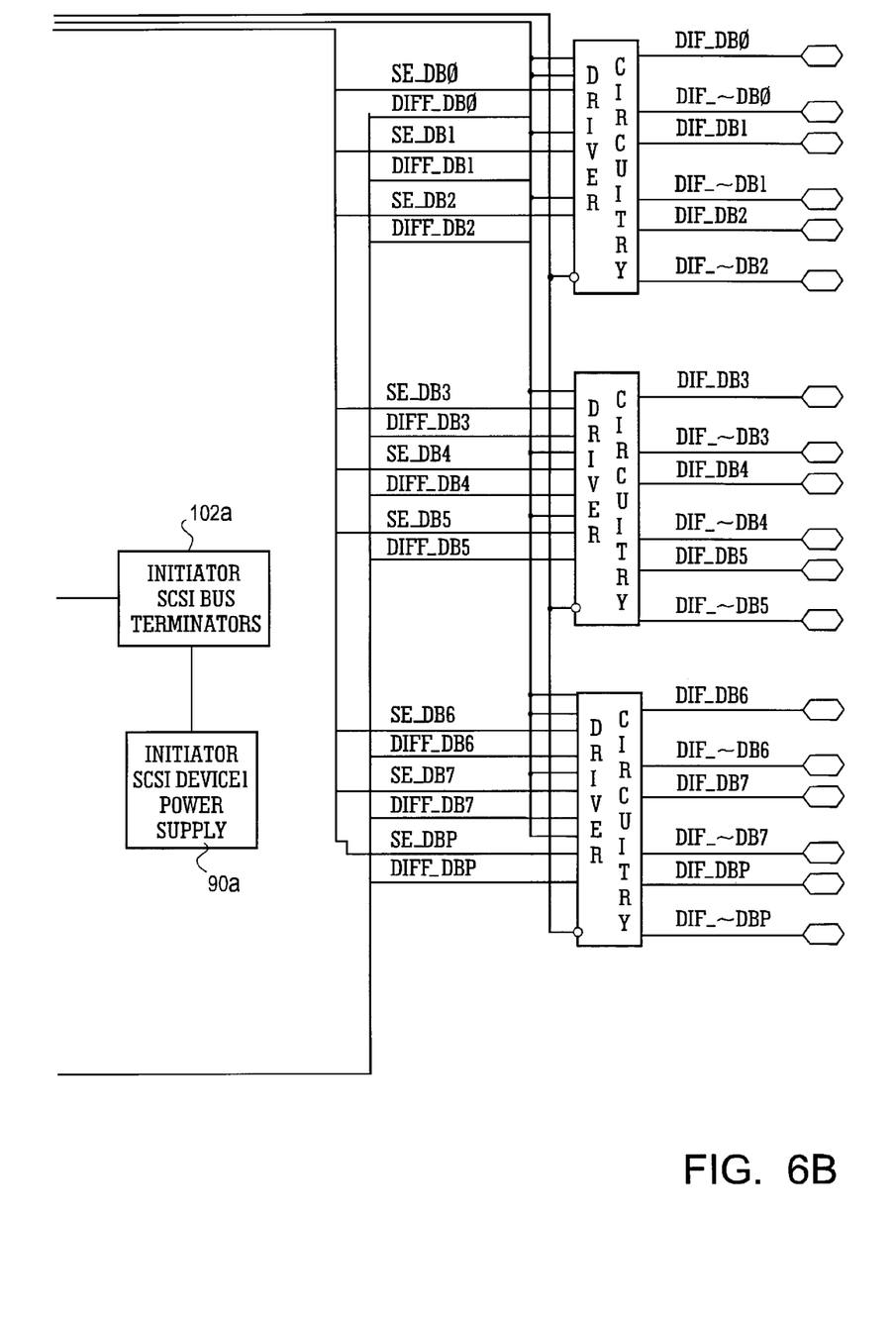

With reference to FIGS. 5 and 6, more detail of the individual signal lines and termination thereof is illustrated. As seen in FIG. 5, the differential control and data lines are terminated using target SCSI bus terminators 110a. Referring to FIG. 6, single-ended control and data lines are terminated using initiator SCSI bus terminators 102a.

With respect to the embodiment of FIG. 2, it should be appreciated that, although the PAL 58 is illustrated as two separate parts, it is preferably one unit. Similarly, although the driver/receiver circuitry 54 is illustrated as three separate parts, it also is typically a single part. Additionally, in some cases, the states of the single-ended control signals are indicated as being in their inverted state. Similarly, driver and receiver enable signals are indicated as being outputted from the PAL 58 in their inverted state. It should be appreciated that an implementation could be devised in which such signals are utilized in their non-inverted state.

The foregoing discussion of the invention has been presented for purposes of illustration and description. Further, the description is not intended to limit the form disclosed therein. Consequently, variations and modifications commensurate with the above teachings, and the skill or knowledge in the relevant art, are within the scope of the present invention. The embodiments described hereinabove are further intended to explain the known modes of practicing the invention and to enable others skilled in the art to utilize the invention and various embodiments and with the various modifications required by their particular applications or uses of the invention. It is intended that the appended claims be construed to include alternative embodiments to the extent permitted by the prior art.

What is claimed is:

1. An apparatus for translating SCSI control signals, comprising:
   first means for receiving a first plurality of control signals from a single-ended SCSI bus;
   second means for receiving a second plurality of control signals from a differential SCSI bus, wherein one of said first plurality and second plurality of control signals being outputted by a target device and the other thereof being outputted by an initiator device, said first plurality of control signals having a first subgroup and said second plurality of control signals having a second subgroup, wherein each of said control signals in said first subgroup has a counterpart signal in said second subgroup having the same function, and in which each of said control signals in said first subgroup and its counterpart in said second subgroup is defined as a counterpart pair and said control signals of said counterpart pair represent bidirectional SCSI signals, with one of said counterpart pairs representing bidirectional reset signals including a single-ended reset signal and a differential reset signal; and
   third means responsive to said first and second means for controlling transmission of said counterpart pairs through said apparatus, said third means including programmable array logic and control logic circuitry communicating with said programmable array logic, said programmable array logic including input lines for inputting said counterpart pairs and output lines for outputting two enable signals for each of said counterpart pairs, said control logic circuitry having input lines for inputting said counterpart pairs and being responsive to said enable signals and transmitting or blocking said signals in said counterpart pair in response to said enable signals.

2. An apparatus, as claimed in claim 1, wherein:
   said first subgroup includes said single-ended reset, single-ended select and single-ended busy signals and said second subgroup includes said differential reset, differential select and differential busy signals.

3. An apparatus, as claimed in claim 2, wherein:
   each of said enable signals has a logic state and said logic state of a first of said enable signals depends substantially only on said single-ended reset and said differential reset, said logic state of a second of said enable signals depends substantially only on said single-ended select and said differential select and said logic state of a third of said enable signals depends substantially only on said single-ended busy and said differential busy.

4. An apparatus, as claimed in claim 1, wherein:
   said two enable signals of each of said counterpart pairs have opposite logic states.

5. An apparatus, as claimed in claim 1, wherein:
   at least each of three enable signals of said counterpart pairs being generated using logic that is substantially the same but comprised of different logic means in said programmable array logic.

6. An apparatus, as claimed in claim 1, wherein:
   said programmable array logic generates a priority signal that depends upon a control signal from the single-ended SCSI bus and said counterpart control signal from the differential SCSI bus.

7. An apparatus, as claimed in claim 6, wherein:
   a logic state of said first priority signal depends substantially only upon said single-ended reset and said differential reset.

8. An apparatus, as claimed in claim 1, wherein:
   said counterpart pairs include single-ended select and a differential select and a single-ended busy and differential busy signals and in which a combination of said single-ended reset and said differential reset is applied to logic that is substantially equivalent to that logic to which each of a combination of said single-ended select and said differential select is applied and a combination of said single-ended busy and said differential busy is applied.

9. An apparatus, as claimed in claim 1, wherein:
   said first means includes first connecting means and said second means includes second connecting means, wherein the single-ended SCSI bus is connectable to one of said first and second connecting means and the differential SCSI bus is connectable to the other one of said first and second connecting means and in which the initiator device is selectably connectable to either one of the single-ended and differential busses.

10. An apparatus, as claimed in claim 1, wherein:

said control logic gate circuitry includes a plurality of control gates, each of said control gates for receiving a predetermined control signal of said counterpart pairs, each of said control gates being controlled using one of said enable signals from said programmable array logic.

11. An apparatus, as claimed in claim 1, further including:

first terminator power means in the single-ended SCSI bus for supplying power to components of at least one of said first means, second means and third means.

12. An apparatus, as claimed in claim 11, wherein:

said first terminator power means includes a first terminator power pin receiving power from a SCSI device.

13. An apparatus, as claimed in claim 1, wherein:

at least two target devices are connected to the single-ended SCSI bus and at least a first initiator device and one of a second initiator device and a target device are connected to the second differential SCSI bus, wherein terminating means is connected to each end of the single-ended and differential SCSI busses and each of the initiator and target devices is also connected to each of the ends.

14. A method for translating between SCSI single-ended and differential signals using single-ended and differential SCSI busses and in which a target device and an initiator device communicate with a different one of each of the two busses, comprising:

receiving by said differential SCSI bus at controlled times each one of a plurality of first SCSI control signals communicating with said target device, said first SCSI control signals including at least differential reset, differential select and differential busy;

receiving by said single-ended SCSI bus at controlled times each one of a plurality of second SCSI control signals communicating with said initiator device, said second SCSI control signals including at least single-ended reset, single-ended select and single-ended busy, said differential reset and single-ended reset signals defining a counterpart pair, said differential select and single-ended select signals defining a counterpart pair and said differential busy and single-ended busy signals defining a counterpart pair; and controlling transferring data and control signals between differential and single-ended SCSI busses, wherein said controlling step includes determining, for each of said counterpart pairs, whether to transmit one thereof and in which, for each of said counterpart pairs, said determining step is conducted independently of said other counterpart pairs including determining whether to transmit one of said differential reset and single-ended reset signals independently of said signals of said other counterpart pairs.

15. A method, as claimed in claim 14, wherein:

said controlling step includes using programmable array logic and said determining step includes using substantially the same logic but different logic means in said programmable array logic in determining whether to transmit one of said counterpart pairs for each of said counterpart pairs.

16. A method, as claimed in claim 14, wherein:

said controlling step includes regulating first and second control gates using enable signals.

17. A method, as claimed in claim 14, wherein:

said controlling step includes using programmable array logic and said step of determining includes ascertaining whether one of a single-ended busy signal and a differential busy signal is present using said programmable array logic wherein said presence is determined using substantially only said single-ended busy and differential busy signals.

18. A method, as claimed in claim 17, wherein:

said controlling step includes generating a differential busy priority signal when said differential busy signal and said single-ended busy signal are received at the same time by said programmable array logic.

19. A method, as claimed in claim 14, further including:

supplying power using first terminator power means to components used in said method and which components are connected to at least one of said differential and single-ended SCSI busses.

20. An apparatus, as claimed in claim 1, where:

said programmable array logic generates an enable signal for each counterpart pair independently of said other counterpart pairs including generating enable signals for said differential reset and single-ended reset signals independently of said other counterpart pairs.

* * * * *